(12) United States Patent
Robadey et al.

(10) Patent No.: US 9,971,964 B2
(45) Date of Patent: May 15, 2018

(54) TAMPER RESISTANT TAG

(71) Applicant: ASSA ABLOY AB, Stockholm (CH)

(72) Inventors: Jean-Miguel Robadey, Bossonnens (CH); Eric Suligoj, Epalinges (CH)

(73) Assignee: ASSA ABLOY AB, Stockholm (SE)

( * ) Notice: Subject to any disclaimer, the term of this patent is extended or adjusted under 35 U.S.C. 154(b) by 0 days. days.

(21) Appl. No.: 15/438,912

(22) Filed: Feb. 22, 2017

(65) Prior Publication Data

US 2017/0262747 A1    Sep. 14, 2017

(30) Foreign Application Priority Data

Mar. 10, 2016    (EP) .................................... 16159557

(51) Int. Cl.
*G06K 19/077*        (2006.01)
*G06K 19/073*        (2006.01)

(52) U.S. Cl.
CPC . *G06K 19/07381* (2013.01); *G06K 19/07758* (2013.01)

(58) Field of Classification Search
CPC ............................................... G06K 19/07758
USPC ......................................................... 235/492
See application file for complete search history.

(56) References Cited

U.S. PATENT DOCUMENTS

| | | | | |
|---|---|---|---|---|
| 7,301,462 B1 * | 11/2007 | Holling | ................ | G06Q 20/327 340/10.1 |
| 7,557,715 B1 * | 7/2009 | Noakes | ............ | G06K 19/07381 340/572.1 |
| 2009/0128340 A1 * | 5/2009 | Masin | .............. | G06K 19/07798 340/572.9 |
| 2010/0181374 A1 * | 7/2010 | Martis | ................. | G06F 19/3462 235/375 |
| 2012/0145794 A1 * | 6/2012 | Mieslinger | ....... | G06K 19/07749 235/488 |
| 2012/0187197 A1 * | 7/2012 | Masin | .............. | G06K 19/07758 235/492 |
| 2013/0021157 A1 * | 1/2013 | Teeter | ..................... | G09F 21/04 340/572.3 |
| 2015/0339568 A1 * | 11/2015 | Nekoogar | ........ | G06K 19/07798 235/492 |
| 2016/0117585 A1 * | 4/2016 | McDowell | ....... | G06K 19/07758 206/459.5 |

OTHER PUBLICATIONS

European Search Report dated Aug. 22, 2016, for European Patent Application No. EP 16 15 9557.

* cited by examiner

*Primary Examiner* — Allyson Trail
(74) *Attorney, Agent, or Firm* — Sheridan Ross P.C.

(57) ABSTRACT

The present invention concerns a smart tag for attachment to an object. The smart tag comprises an electronic system for contactless communication, a support to which at least part of the electronic system is fixed and at least one destruction component means configured to act on at least one element of the electronic system, when the smart tag is removed from said object, to demolish said at least one element of the electronic system. In at least one embodiment, the destruction component may be a demolisher movably mounted to pass through said support from a first position on one side of the support to a second position on the other side of the support.

22 Claims, 5 Drawing Sheets

TAMPER RESISTANT TAG

CROSS-REFERENCE TO RELATED APPLICATIONS

This application claims the benefit of European Patent Application No. EP 16159557.4 filed Mar. 10, 2016, the entire contents of which are incorporated herein.

FIELD OF THE INVENTION

The present invention generally relates to a tamper resistant tag for attachment to an object. More particularly, the present invention concerns a hard tag made from a rigid substance and that includes a tamper mechanism permitting tampering of the tag to be identified.

BACKGROUND

RFID tags are used to identify an object and/or object user and to permit the object access to a service or area upon authentication or validation of the information provided by the RFID tag.

For example, such a tag can be used to identify one vehicle and services such as parking access, commercial fuel refilling or toll payments can then be provided to the vehicle and vehicle user.

However, for certain services it is important to assure that an RFID tag is associated with solely one object and remains associated with only that object.

For example, when an RFID tag permits access to a restricted parking area for which an annual subscription is paid for uniquely one vehicle, it is necessary to assure that only that one vehicle is allowed access to the parking facilities and that the RFID tag cannot be transferred and used with other vehicles. At the very least, it should be assured that any such transfer can be determined.

U.S. Pat. No. 8,242,916 discloses an RFID tag that is wrapped around an object using an attaching band. The attachment of the tag to an object compresses an elastic member of the tag to therein store elastic energy. The complete removal of the tag permits the release of the stored elastic energy which results in the RFID tag being damaged.

However, this RFID tag will remain functional if removed from the object in a manner that prevents the elastic member expanding and releasing the energy stored therein. Moreover, as such a tag ages the stored elastic energy will gradually be lost and it cannot be assured that the tag will be rendered non-operational or tampering detected when the tag is removed from the object after a long period of time.

U.S. Pat. No. 7,301,462 discloses an electronic tag having a hard plastic support case for carrying an integrated circuit. An electronic circuit is attached to the integrated circuit. When the tag is removed from the object to which it is attached, the integrated circuit interconnection to the electronic circuit breaks, and the integrated circuit together with the support case is removed while the electronic circuit remains attached to the object, thereby rendering the tag inoperable.

However, the removal process of the tag from the object does not assure that the tag is rendered inoperable because the interconnection may not fully break if the tag is slowly removed. Moreover, during a gentle removal action the imminent separation of the integrated circuit together with the support case from the remaining circuit may become apparent and the removal action interrupted and replaced by an alternative removal manner that ensures that the entire tag is removed and tampering is not detected. Indeed, the tag of U.S. Pat. No. 7,301,462 even includes a notch permitting to remove the tag without rendering the tag inoperable that would then likely be exploited.

The present invention addresses the above mentioned problems of known tags.

SUMMARY OF THE INVENTION

The present invention moreover provides a tag assuring that a particular right or privilege attributed only to one specific item remains with that item and is not shared or transferred to another object. That is, the present invention provides a tag that can only be attached once to one single item and still remain functioning. If transferred to another item, this transfer is immediately detected permitting the tag provider to act and invalidate the rights attributed to the tag.

The tag according to the present invention assures that a functional failure or an electronic detection will occur should the tag be detached from a first object and reattached to a second object.

Additionally, the tag according to the present invention renders it extremely difficult and nearly impossible to re-use the failed parts of the tag or to repair/reproduce the functionality of the tag without it being noticed.

Furthermore, in addition to the above mentioned advantages, the tag according to the present invention can be produced using standard fabrication processes ensuring low fabrication cost and the widespread availability of the technology.

The present invention accordingly concerns a tag for attachment to an object according to claim 1.

The tag of the present invention advantageously includes a destruction mechanism including a demolisher or cutter that is movably mounted in the tag to be displaced and to pass through a support, to which at least part of an RFID electronic communication system is fixed, when the tag is separated from an object to which it is attached. The electronic system can include a passive or active tag, RTLS, Bluetooth, BLE or any other identification technologies with RF communication or others such as visual or based on sound.

The cutter is mounted in a manner to be displaced from a first position in front of the support to a second position behind the support at which the cutter has been removed from the tag. The displacement of the cutter through the support and out of the tag assures that the cutter acts on at least a part of the RFID electronic system to damage the tag electronics or a part of the system and demolish the element of the system acted upon by the cutter thus rendering the tag non-operational.

The tag according to the present invention thus assures that removal of the tag from an object renders the tag immediately non-operational or assures that the tag is rendered non-operational via detection of tampering with the tag by a tag provider who can invalidate the rights attributed to the tag. It can also thus be assured that a particular right or privilege attributed only to a specific object remains with that object and cannot be shared or transferred to another object.

Further advantageous of the present invention are provided by the features of the dependent claims.

In particular, the tag of the present invention further includes a protection lid fixedly attached to the support to define a housing enclosing the RFID circuitry and the antenna. This advantageously limits accessibility to, for example, the RFID circuitry and antenna from the outside thus rendering it extremely difficult and nearly impossible to re-use the damaged parts of the tag or to repair/reproduce the functionality of the tag.

Moreover, the protection lid is fixedly attached to said support using ultrasonic welding, gluing, injection or clipping to prevent reparation of the tag.

Moreover, the tag of the present invention further includes a demolisher or cutter base including at least one arm extending outwards from the base, the cutter being located at an outer extremity of the arm. Such a 'guillotine' like structure advantageously allows a fast and clean destruction of part of the RFID circuitry or antenna to assure that the tag is rendered non-operational or to detect electrically tamper via, for example, a wire loop included in the electronic communication system of the tag.

In addition, at least a part of the electronic communication system is located between the cutter and an opening of the support so as to assure that an element of the system is cleanly destructed when the tag is removed separated from an object.

Moreover, the tag includes first attachment means for attaching the demolisher or cutter to the support, and second attachment means for attaching the cutter base to an object. The first attachment means is weaker than the second attachment means and thus ruptures before the second attachment means when a force pulling the tag away from the object is applied. This advantageously assures that the cutter is brusquely removed to assure a quick and clean destruction of, for example, the RFID circuitry or antenna or a tamper loop.

DESCRIPTION OF THE DRAWINGS

The above object, features and other advantages of the present invention will be best understood from the following detailed description in conjunction with the accompanying drawings, in which.

DETAILED DESCRIPTION

Figure 1:
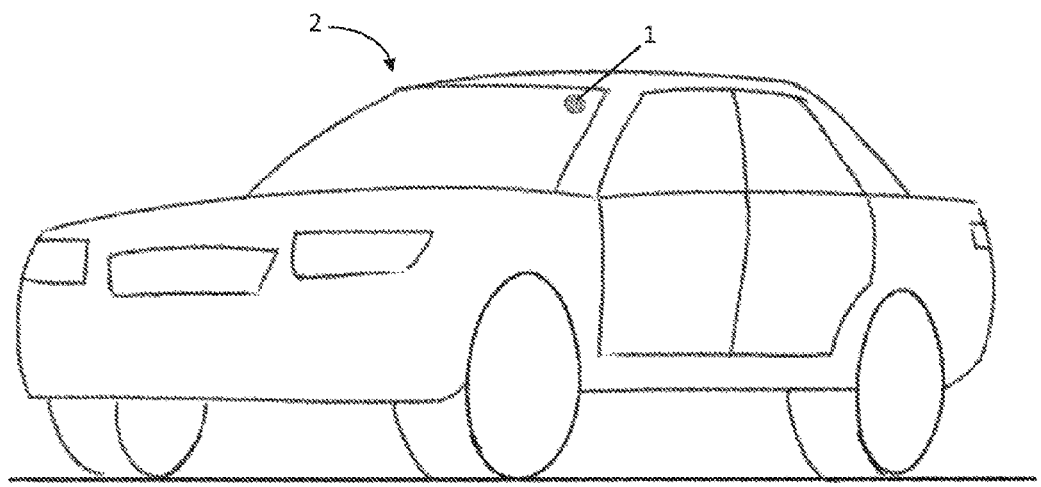
FIG. 1 illustrates a tag according to the present invention attached to an exemplary object that is the windshield of a vehicle.
Figure 2:
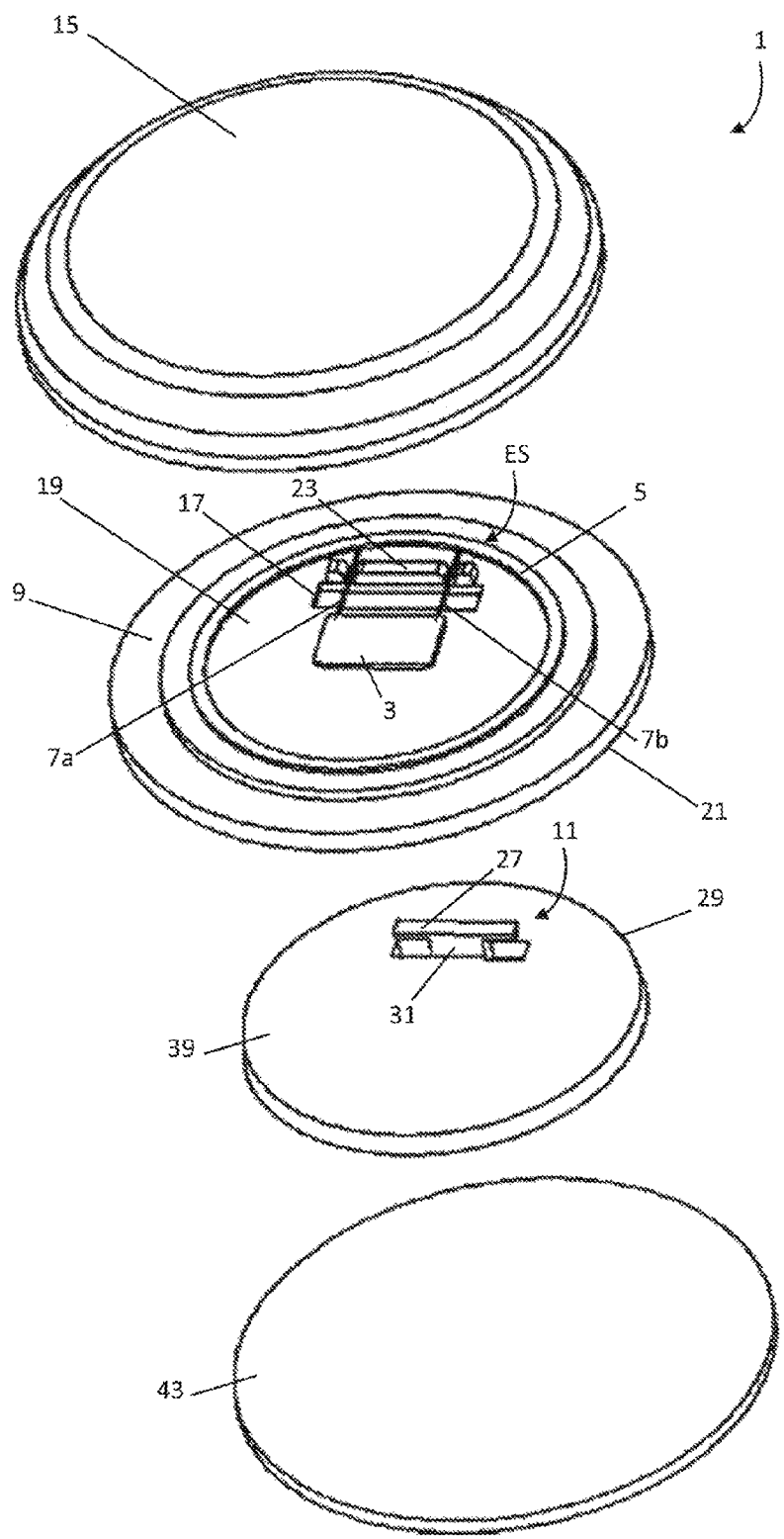
FIG. 2 is an exploded view of an exemplary tag according to the present invention.

FIGS. 1 and 2 illustrate an exemplary tag 1 according to the present invention. The smart tag 1 is to be attached to an object 2. The tag 1 permits for example a one-time only attachment of the tag to this object 2. That is, detachment of the tag 1 from the object 2 renders the tag 1 non-operational either immediately or eventually by a tag provider when tampering is detected.

The tag 1 is a tamper resistant tag. The tag 1 is a hard tag and the components of the tag are made, for example, of plastic, a polymer type or any other rigid or semi rigid substance.

In FIG. 1, the tag 1 is illustrated as being attached to a windshield of a vehicle 2 to assure, for example, that uniquely this vehicle 2 is allowed access to a service such as a parking area, commercial fuel refilling, toll payments, etc.

This is of course only one possible application of the tag 1 and the tag may be used for many others such as elevator maintenance or bed tracking in a hospital. The tag 1 can also be used as an electronic seal.

The tag 1 includes an electronic system ES for contactless communication. The electronic system ES is configured for contactless communication of the tag 1 with for example a tag reader. The electronic system ES is configured to communication data to the tag 1 from an external device and/or to communicate data from the data to an external device, such as a tag reader.

In the exemplary illustrated embodiment, electronic system ES includes an integrated circuit (IC) 3 configured to carry out RFID functionality and an antenna 5 connected to the integrated circuit 3 via portions 7a, 7b of the antenna 5. The portions 7a, 7b extend from the antenna 5 to connect to the integrated circuit 3.

The IC is for example configured for LF, HF, UHF, Bluetooth or WIFI operation or any combination of these. The IC can be powered by battery (BAP/Active Tag) or be passive.

The antenna 5 can be for example a wire antenna, printed antenna or an etched antenna.

The tag 1 further includes a support 9 and destruction means or destruction mechanism 11.

In the illustrated embodiment, the integrated circuit 3 and the antenna 5 are attached to the support 9 (for example glued), meaning that integrated circuit 3 and the antenna 5 are immobile with respect to the support 9.

It is however not necessary that both the integrated circuit 3 and the antenna 5 are attached to the support 9. At least a part of the integrated circuit 3 or a part of the antenna 5 is fixed to the support 9.

The tag 1 can additionally include a lid 15 fixedly attached to the support 9 to define a housing 16 (see FIG. 3) enclosing the integrated circuit 3 and the antenna 5. This permits to limit accessibility to the integrated circuit 3 and the antenna 5 from the outside by an unauthorized person attempting to repair the tag electronic components or an unauthorized person attempting to modify the RFID functionality of the tag 1.

The lid 15 is for example fixedly attached to the support 9 using ultrasonic welding, gluing, injection or clipping to prevent removal of the lid 15 from the support 9 and prevent opening of the housing 16.

The lid 15 can also act as a support to which the integrated circuit 3 and/or the antenna 5 are attached, or at least a part of the integrated circuit 3 or a part of the antenna 5 is fixed to the lid 15.

Alternatively, the integrated circuit 3 (or part of the integrated circuit 3) can be attached to the lid 15 and the antenna 5 (or part of the antenna 5) can be attached to the support 9, or vice versa.

The integrated circuit 3 and/or antenna 5 may be encapsulated or covered in a hardened product, such as a glue, to further restrict access to these elements. This renders it extremely difficult and nearly impossible to re-use the failed parts of the tag or to repair/reproduce the functionality of the tag.

The support 9 delimits an opening (or passage) 17 that traverses completely through the support 9 from a first side 19 to an opposite second side 21 (FIG. 2).

Figure 4:
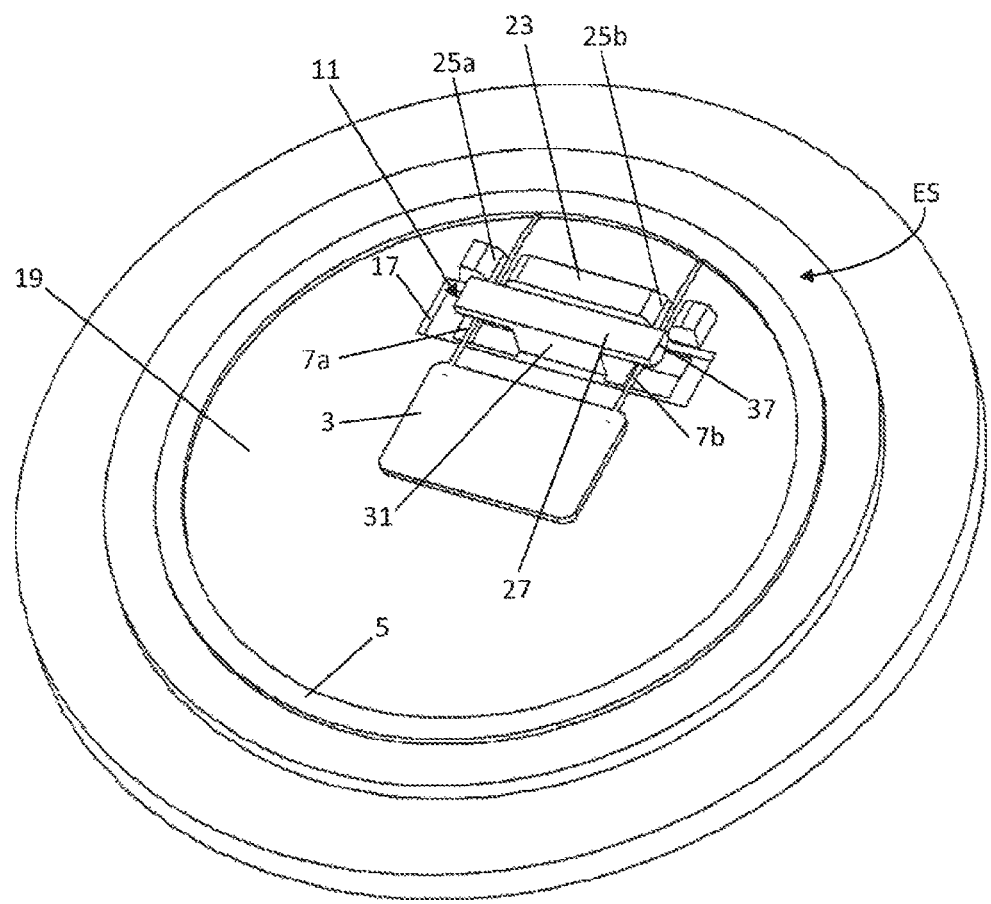
FIG. 4 is a perspective view of an exemplary tag according to the present invention without an outer lid.

The support 9 optionally includes a holder 23 for holding the portions 7a, 7b of the antenna. The holder 23 includes a first 25a and second 25b clip or pinching member (see FIG. 4) configured to receive and hold the portions 7a, 7b respectfully.

This permits the portions 7a, 7b to be rigidly held and the destruction means 11 to cleanly and rapidly act on the portions 7a, 7b of the antenna to assure the destruction of portions 7a, 7b.

The destruction means 11 is configured to act on the integrated circuit 3 or the antenna 5 when the tag is being separated from the object to which the tag is attached. The destruction means 11 act on the integrated circuit 3 or the antenna 5 to render the tag non-operational. That is, when the tag 1 that has been attached to an object 2 is being pulled or moved away from the object 2, the destruction means 11 is activated and renders the tag non-operational.

The destruction means 11 includes a demolisher, for example, a cutter 27. The cutter 27 is movably mounted in the tag 1 to pass through the support 9.

The cutter 27 moves from a first position where it is located at the first side 19 of the support 9 (in front of the support 9) to a second position where the cutter is located at the second side 21 of the support 9 (behind the support 9) after having passed through the opening 17.

At the second side 21, the cutter 21 (and the destruction means 11) has been removed from the tag 1 and has rendered the tag non-operational by its removal from the tag 1.

If the tag 1 includes the lid 15, the cutter 27 moves from a first position where it is located inside the housing 16 to a second position where the cutter 27 is located outside the housing 16 (and outside the tag 1) having passed through the opening 17 of the support 9.

Outside the housing 16, the cutter 21 is at a position where it has been removed from the tag 1 and has rendered the tag 1 non-operational by its removal from the tag 1.

The cutter 27 can be metallic or plastic or a combination of different conductive or none conductive materials.

The destruction means 11 further includes a cutter base 29 and an arm 31 extending outwards from the base 29. The cutter 27 is located at an outer extremity of the arm 31.

At the opposite side of arm 31, the arm 31 includes an attachment member 33 that attaches the arm 31 to the base 29. The base 29 delimits a connection socket 35 (FIG. 3) for receiving and holding the attachment member 33. The attachment member 33 and the socket 35 have complementary shapes.

During assembly of the tag 1, the arm 31 is initially easily detachable from the socket 35 of the base 29. This allows the cutter 27 to be placed in the above mentioned first position where, for example, the portions 7a, 7b are located between the cutter 27 and the opening 17.

The detached arm 31 and the attachment member 33 is extended through the opening 17 through to the second side 21 of the support 9 where the attachment member 33 is fixedly attached in the socket 35 and to the base 29.

The attachment member 33 is for example fixedly attached to the base 29 using ultrasonic welding or gluing to prevent removal of the arm 31 from the base 29.

Alternatively, in a preferred embodiment, the base 29, the arm 31 and the cutter 27 form one non detachable or integral single piece, manufactured for example, by plastic injection molding. This simplifies the mounting of the different pieces of the tag, although requiring that the elements of the electronics which need to interact with the cutter 27 (such as the portions 7a, 7b of the antenna 5) need to be placed adequately with regards to the cutter 27 during mounting. Preferably, the electronic component or components used incorporate some flexibility permitting the related electronic element or elements to be displaced or deformed in order to be mounted around the arm 31 and/or under the cutter 27 (between cutter 27 and the opening 17).

The cutter 27 comprises a three-dimensional body 37 extending substantially perpendicularly from the outer extremity of arm 31. The body 37 includes a cutting surface or edge that cuts or demolishes the portions 7a, 7b of the antenna 5 (in the illustrated example) when the cutter 27 is moved to the above mentioned second position.

The portions 7a, 7b of the antenna 5 are located between the cutter 27 and the opening 17 so as to render the tag non-operational when the tag is separated or being separated from the object 2. As seen in the Figures, the cutter 27 is for example a (small) guillotine placed on top of the wire portions of the antenna 5.

The above mentioned holder 23 maintains the portions 7a, 7b between the cutter 27 and the opening 17. This permits the portions 7a, 7b to be rigidly held and the cutter 27 to cleanly and rapidly act on the portions 7a, 7b of the antenna to assure the destruction of portions 7a, 7b when the cutter 27 is displaced between the previously mentioned first and second positions.

The illustrated embodiment shows the portions 7a, 7b of the antenna 5 located between the cutter 27 and the opening 17. However, the integrated circuit 3 (or a part of it) could additionally or alternatively be located between the cutter 27 and the opening 17 in order to render the tag non-operational. In such a case, the holder 23 is configured to maintain part of the integrated circuit 3 between the cutter 27 and the opening 17.

The present invention is not however limited to the electronic components and elements illustrated in the Figures and described above. The electronic system ES can include further or different elements or components upon which the destruction means or mechanism 11 acts to render the tag immediately non-operational or non-operational through tampering detection.

Any element which is part of the electronic system ES and whose partial destruction can impacts the functioning of the said system can be used instead of the antenna portions 7a and 7b of the presented embodiment. For example, in the case of a UHF RFID unit, a patch antenna comprising bridges between radiative elements is used. The destruction of the bridge by the cutter 27 detunes the antenna to a different resonant frequency, making therefore the tampering of the tag detectable by a reader unit.

Figure 5:
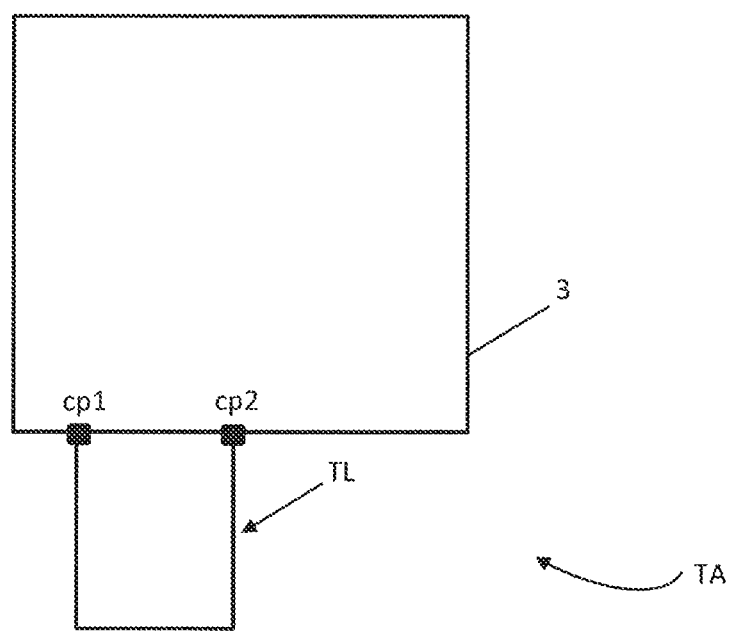
FIG. 5 is a schematic of a tamper device according to the present invention.

In a particularly preferred embodiment, the electronic system ES configured for contactless communication further includes a tampering device or assembly TA as schematically illustrated in FIG. 5.

This assembly TA includes a tampering loop TL connected to specific connection pads cp1, cp2 of the integrated circuit 3 of the system ES. The loop TL is, for example, a continuous wire loop between the pads. The demolisher 27 acts on at least one portion of the loop TL (or one of the pads) to destroy or interrupt the continuity of the loop. The IC 3 is configured to detect a change in a measured parameter of the loop TL, for example, the resistance of the loop (in such as case the illustrated loop can include a resistor) or energy flowing through the loop. The IC 3 is further configured to assign or change a flag status or logical value in a tag memory of the system ES when a change in the measured parameter is determined by the IC 3.

This logical value, which represents a tampering status, is included as part of data communicated by the tag when answering a request of a tag reader and allows a tampering status of the tag to be determined and detected without negatively impacting on the communication properties of the tag itself.

The tampering device TA is thus configured to determine an activation of the demolisher 27 and to set a tampering status of the tag memory. The system ES is configured to transmit the tampering status of the tag memory from the tag to a tag reader.

Alternatively, the tampering loop TL may, for example, comprise an optical loop such as an optical waveguide, an optical emitter and detector where the destruction means 11 preferably acts on the optical waveguide to demolish the guide.

The tag 1 includes first attachment means AM for attaching the base 29 to the support 9.

Figure 3:
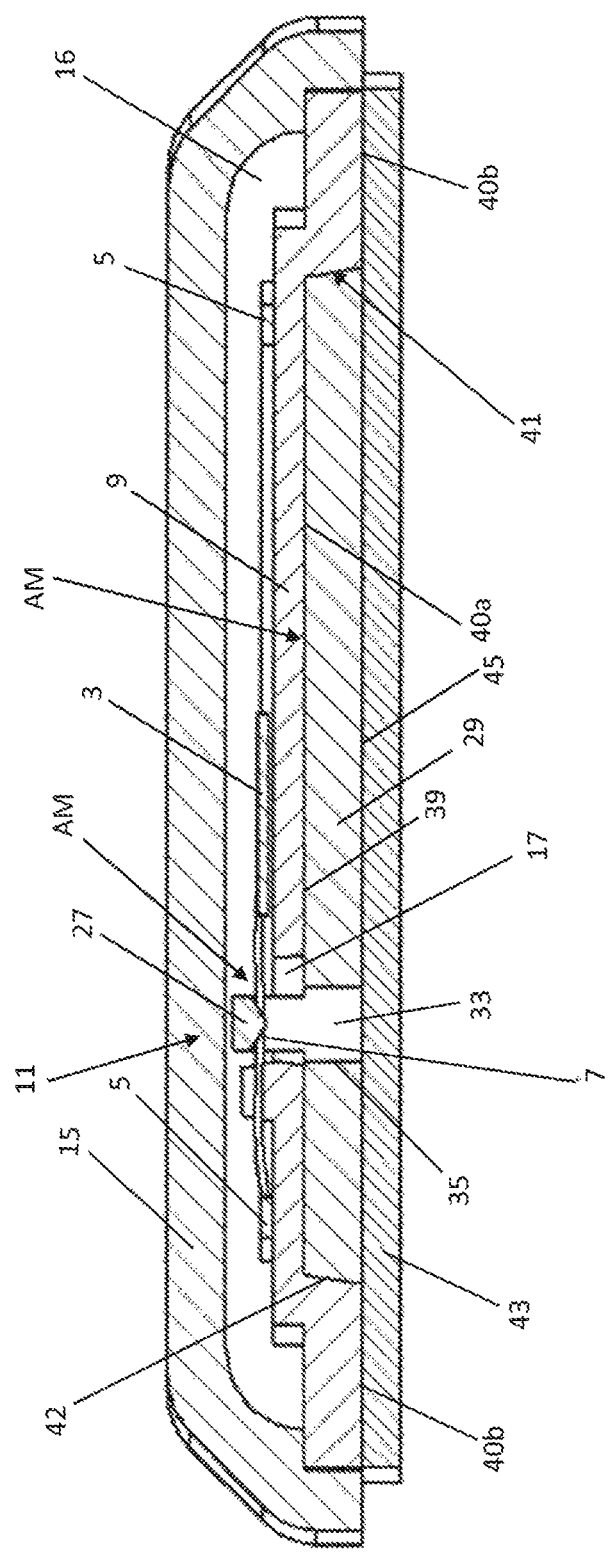
FIG. 3 is a cross section view of an exemplary tag according to the present invention.

The first attachment means AM may solely comprise the cutter 27 in contact with the antenna portions 7a, 7b (or a part of the IC) or held between the lid 15 and the antenna portions 7a, 7b (or a part of the IC) as shown in FIG. 3. This allows the cutter 27 to be held in the above mentioned first position and, for example, the base 29 to be held in contact with the lower surface of the support 9 as can be seen in FIG. 3.

Additionally, to permit a stronger fixation, the base 29 may be mechanically attached to the support 9 or attached using an adhesive (for example using a double sided, adhesive tape, glue or welding). For example, an upper surface 39 of the base 29 can be adhered to the lower surface 40a of the support 9, or the support 9 delimits a receptacle 41 (FIG. 3) for receiving the cutter base 29 and the cutter base 29 is attached via, for example, a snap-fit mechanism provided by complementary protrusions and grooves located on the walls of the base 29 and receptacle 41.

A perimeter wall 42 of the receptacle 41 can be tapered outwards to permit easier detachment of the cutter base 29 from the support 9.

In a preferred embodiment, first attachment means includes a few welding or gluing spots (or zones) (for example 2 to 4 spots located between the base 29 and the support 9) are to attach the base 29 to the support 9. Each spot or zone defines a predetermined contact area in contact with support 9.

Adding or removing one or more welding spots permits to vary the effective total attachment surface in contact with the support 9 and allows one to adapt the adhesive or shear force quite precisely and efficiently.

This allows the attachment strength of the first attachment means AM to be determined and set to be lower than that of the second attachment means 43.

The tag 1 further includes second attachment means 43 for attaching the tag or cutter base 29 to an object 2.

The second attachment means 43 may comprise, for example, double sided adhesive tape 43 where a first side of the tape 43 is attached to a lower surface 45 of the base 29 and/or the lower surface 40b of the support 9 (FIG. 4b). The tape 43 could alternatively be only attached to the lower surface 45 of the base 29. The chosen surface area to which the tape is attached allows the strength of adhesion to the object 2 to be chosen and changed as will be discussed further below.

The first attachment means AM is configured to rupture to permit the displacement of the cutter 27 from the above mentioned first position to the second position when a force pulling the tag 1 (support 9 or lid 15) away from the object 2 is applied.

Additionally, the first attachment means AM is configured or arranged to rupture before the second attachment means 43 ruptures when a force pulling the tag 1 away from the object 2 is applied. The first attachment means AM is weaker than the second attachment means.

This results in the cutter 27 cutting through the antenna 5 (or IC), passing through the opening 17 and exiting the tag 1. The support 9 (and the lid 15) separates and fully detaches from the destruction means 11. The cutter 27, arm 31 and the base 29 are left attached to the object 2 while the support 9 (and the lid 15) are removed from the object 2. In the illustrated example, the RFID functionality of the removed support 9 has been rendered non-operational by the action of the cutter 27 on the antenna 5 (or IC).

The tag 1 has been split into a first removed part including the RFID functionality elements and a second part including the destruction means that remains attached to the object 2. As a result it is manifestly visible that tampering has been carried out to the tag.

For example, when the first attachment means solely comprise the cutter 27 in contact with the antenna portions 7a, 7b (or held between the lid 15 and the antenna portions 7a, 7b) and the second attachment means solely comprises the double sided tape 43 attached to the surface 45 of the base 29 and surface 40b of the support 9, the antenna portions 7a, 7b are configured to break by the force applied by cutter 27 before the double sided tape 43 separates from the base 29.

The attachment strength of the first attachment means AM can be varied and determined, for example, via the chosen thickness of the antenna portions 7a, 7b and by the additional use of a mechanical attachment and/or a double sided adhesive tape or by varying the number of welding or gluing spots. The attachment strength can for example be varied by changing the quantity of the double sided adhesive tape or surface area to which it is applied. The attachment strength can be measured by measuring the breaking force required to separate two attached items.

Similarly, the attachment strength of the second attachment means 43 can be varied by changing the quantity of the double sided adhesive tape 43 or the surface area to which the tape 43 is applied. The adhesive strength of the adhesive product of the tape can also be varied.

The tag 1 as illustrated for example in FIG. 3 is attached to an object 2 (for example a windshield of a vehicle) by pressing the double sided tape 43 against a surface of the object 2. When a force pulling the support 9 or lid 15 away from the object 2 is applied, the support 9 (and/or the lid 15) fully separate away from the cutter 27, base 29 and the double sided adhesive tape 43 because the first attachment means is weaker than the second attachment means. The cutter 27, base 29 and double sided adhesive tape 43 remain attached to the object 2 and the support 9 (and/or the lid 15) remain in the hand of the person having applied the pulling force. The RFID elements have been broken and rendered non-operational due to the exiting of the cutter 27 out of the tag 1. As a result, it is clearly visible that tampering has been carried out to the tag.

In the case where the cutter 27 demolishes a tampering loop TL or detunes the antenna to a different resonant frequency, the tampering is detected by a tag reader and the tag then rendered non-operational by, for example, the tag provider.

Having described now the preferred embodiments of this invention, it will be apparent to one of skill in the art that other embodiments incorporating its concept may be used. This invention should not be limited to the disclosed embodiments, but rather should be limited only by the scope of the appended claims.

The destruction means or mechanism 11 may act on a plurality of elements of the electronic system ES and the tag can include a plurality of demolishers 27.

What is claimed is:

1. A smart tag for attachment to an object, the smart tag comprising:
an electronic system for contactless communication;
a support having a first side and a second side, and an opening extending through the support between the first and second sides, and at least a first part of the electronic system is fixed to the first side of the support and at least a second part of the electronic system extends over the opening; and
a demolisher configured to move linearly through the opening between a first position and a second position, wherein in the first position the at least a second part of the electronic system is positioned between the opening and the demolisher and in the second position the demolisher has moved through the opening and is positioned on the opposite side of the support and in so moving the demolisher has disabled the at least a second part of the electronic system.

2. The smart tag according to claim 1, further including a lid fixedly attached to said support to define a housing enclosing the electronic system to limit accessibility to the electronic system from the outside.

3. The smart tag according to claim 2, wherein the lid is fixedly attached to said support using ultrasonic welding, gluing, injection or clipping to prevent opening of the housing.

4. The smart tag according to claim 2, wherein the demolisher is located inside said housing when the demolisher is in said first position, and located outside said housing when the demolisher is in said second position.

5. The smart tag according to claim 4, wherein the demolisher is moved from said first position to said second position when the demolisher base is separated from the support.

6. The smart tag according to claim 5, wherein the support comprises means to maintain said second at least one part of the electronic system located between the demolisher and the opening, such that when the demolisher is displaced from the first to the second position, said second at least one part of the electronic system disrupts the electronic system, rendering the smart tag non-operational.

7. The smart tag according to claim 1, wherein the demolisher comprises a demolisher base positioned proximate the second side of the support, at least one arm extending outwards from said base, and at least one cutter located at an outer extremity of said arm.

8. The smart tag according to claim 7, wherein said arm extends through said opening into the housing when the demolisher is in said first position.

9. The smart tag according to claim 7, wherein said cutter extends substantially perpendicularly from said arm and includes an edge or cutting surface.

10. The smart tag according to claim 7, wherein the tag further includes first attachment means for attaching the demolisher base to the support, and second attachment means for attaching the tag to the object; and wherein said first attachment means is weaker than said second attachment means.

11. The smart tag according to claim 10, wherein the first attachment means are configured to rupture before the second attachment means resulting in the support being detached from the demolisher base and the cutter being displaced from the first to the second position, rendering the smart tag non-operational when one removes or attempts to remove the smart tag from said object.

12. The smart tag according to claim 10, wherein the second attachment means comprise an adhesive layer extending between the demolisher base and the surface of the object to which the tag is attached.

13. The smart tag according to claim 10, wherein the first attachment means comprise a plurality of attachment zones, each attachment zone having a predetermined area in contact with the support.

14. The smart tag according to claim 10, wherein the housing extends entirely over the demolisher base and forms a lid which is fixed to the object all around the demolisher base.

15. A smart tag, comprising:
a support having a first surface and a second surface;
an opening extending through the support from the first surface to the second surface;
an electronic system fixed to the first surface of the support, and a first portion of the electronic system extending over the opening;
a lid affixed to the support and configured to form a housing with the support to enclose the electronic system; and
a demolisher having a base disposed adjacent to the second surface of the support on the exterior of the housing, an arm having a first end connected to the base and a second end spaced from the first end, the arm extending from the base through the opening in the support, and a body extending outwardly from the second end of the arm, the body configured to pass through the opening;
wherein, in a first assembled state, the first portion of the electronic system is positioned between the body and the opening and the electronic system is operational, and in a second tampered state, the base is separated from the support and the demolisher has moved through the opening and rendered the electronic system inoperable.

16. The smart tag of claim 15, wherein the first portion of the electronic system is an antenna.

17. A smart tag, comprising:
a support having a first side and a second side, an opening extending through the support from the first side to the second side;
a demolisher movable through the opening between a first position on the first side of the support and a second position on the second side of the support;
an electronic system secured to the first side of the support, with a first portion of the electronic system positioned between the demolisher and the opening;
wherein, when the demolisher moves from the first position through the opening to the second position, the first portion of the electronic system is rendered inoperable.

18. The smart tag of claim 17, further comprising a lid connected to the support and enclosing the electronic system.

19. The smart tag of claim 17, wherein the first portion of the electronic system is at least one of an antenna and electronic circuitry, and wherein movement of the demolisher from the first position to the second position damages the antenna.

20. The smart tag of claim 19, wherein the demolisher comprises a cutter having at least one of an edge and cutting surface which damages the antenna.

21. The smart tag of claim 17, further comprising a holder secured to the first surface of the support and positioned proximate the opening, the holder configured to hold the first portion of the electronic system.

22. The smart tag of claim 21, wherein the holder comprises at least one of a clip and pinching member.

\* \* \* \* \*